US010618034B2

(12) United States Patent
Kasuya et al.

(10) Patent No.: US 10,618,034 B2
(45) Date of Patent: Apr. 14, 2020

(54) EXHAUST GAS PURIFICATION DEVICE

(71) Applicant: CATALER CORPORATION, Kakegawa-shi, Shizuoka (JP)

(72) Inventors: Chihiro Kasuya, Kakegawa (JP); Kenichi Taki, Kakegawa (JP); Satoshi Matsueda, Kakegawa (JP); Sho Hoshino, Kakegawa (JP)

(73) Assignee: CATALER CORPORATION, Kakegawa (JP)

( * ) Notice: Subject to any disclaimer, the term of this patent is extended or adjusted under 35 U.S.C. 154(b) by 0 days.

(21) Appl. No.: 16/071,444

(22) PCT Filed: Jan. 19, 2017

(86) PCT No.: PCT/JP2017/001812
§ 371 (c)(1),
(2) Date: Jul. 19, 2018

(87) PCT Pub. No.: WO2017/126631
PCT Pub. Date: Jul. 27, 2017

(65) Prior Publication Data
US 2019/0015820 A1    Jan. 17, 2019

(30) Foreign Application Priority Data
Jan. 21, 2016   (JP) .................................. 2016-009954

(51) Int. Cl.
*B01J 23/63*    (2006.01)
*B01J 27/053*   (2006.01)
(Continued)

(52) U.S. Cl.
CPC ............ *B01J 23/63* (2013.01); *B01D 53/945* (2013.01); *B01J 27/053* (2013.01);
(Continued)

(58) Field of Classification Search
CPC .... B01D 2255/1023; B01D 2255/1025; B01D 2255/204; B01D 2255/902;
(Continued)

(56) References Cited

U.S. PATENT DOCUMENTS

2002/0061816 A1\* 5/2002 Uenishi ................ B01D 53/945
502/304
2004/0184978 A1\* 9/2004 Nakatsuji ........... B01D 53/9413
423/239.1
(Continued)

FOREIGN PATENT DOCUMENTS

JP     2001-104786 A    4/2001
JP     2006-297372 A    11/2006
(Continued)

OTHER PUBLICATIONS

Machine translation of Uenishi (JP2001104786), publication date Apr. 17, 2001.\*
(Continued)

*Primary Examiner* — Jun Li
(74) *Attorney, Agent, or Firm* — Oliff PLC

(57) ABSTRACT

An exhaust gas purification device which has improved exhaust gas purification performance. An exhaust gas purification device which includes a first catalyst layer that contains: a Pd-supporting catalyst which is obtained by having alumina carrier particles support Pd; a first Rh-supporting catalyst which is obtained by having first ceria-zirconia carrier particles support Rh; and second ceria-zirconia carrier particles. This exhaust gas purification device is configured such that: the ceria concentration in the first ceria-zirconia carrier particles is 30 wt % or less; and the amount of ceria in the second ceria-zirconia carrier particles is larger than the amount of ceria in the first ceria-zirconia carrier particles.

8 Claims, 2 Drawing Sheets

(51) Int. Cl.
  *B01J 35/00* (2006.01)
  *B01J 37/08* (2006.01)
  *B01D 53/94* (2006.01)
  *F01N 3/10* (2006.01)
  *F01N 3/28* (2006.01)

(52) U.S. Cl.
  CPC ........... *B01J 35/0006* (2013.01); *B01J 37/08* (2013.01); *F01N 3/10* (2013.01); *F01N 3/101* (2013.01); *F01N 3/2803* (2013.01); *B01D 2255/1023* (2013.01); *B01D 2255/1025* (2013.01); *B01D 2255/2042* (2013.01); *B01D 2255/2061* (2013.01); *B01D 2255/2063* (2013.01); *B01D 2255/2068* (2013.01); *B01D 2255/2092* (2013.01); *B01D 2255/407* (2013.01); *B01D 2255/908* (2013.01); *B01D 2255/9022* (2013.01); *B01D 2255/9025* (2013.01); *F01N 2370/02* (2013.01); *F01N 2510/0684* (2013.01)

(58) Field of Classification Search
  CPC .... B01D 2255/9022; B01D 2255/9025; B01D 53/945; B01J 23/63; B01J 27/053; F01N 3/101; F01N 3/2803; F01N 2510/0684; F01N 2370/02
  See application file for complete search history.

(56) References Cited

U.S. PATENT DOCUMENTS

| | | |
|---|---|---|
| 2006/0217263 A1 | 9/2006 | Kawamoto et al. |
| 2010/0124523 A1 | 5/2010 | Chen et al. |
| 2014/0171301 A1 | 6/2014 | Lim et al. |
| 2016/0288100 A1* | 10/2016 | Goto ........................ B01J 23/63 |

FOREIGN PATENT DOCUMENTS

| | | |
|---|---|---|
| JP | 2010-274162 A | 12/2010 |
| JP | 2014-117700 A | 6/2014 |
| JP | 2014-136175 A | 7/2014 |
| JP | 2015-85241 A | 5/2015 |

OTHER PUBLICATIONS

Feb. 21, 2017 International Search Report issued in International Patent Application No. PCT/JP2017/001812.

Aug. 19, 2019 Extended Search Report issued in European Patent Application No. 17741508.0.

* cited by examiner (a)

(b)

(c)

EXHAUST GAS PURIFICATION DEVICE

FIELD

The present invention relates to an exhaust gas purification device.

BACKGROUND

Exhaust gas generated in the gasoline combustion process contains CO, HC and NOx. Three-way catalysts are known as exhaust gas purification devices that purify these three types of exhaust gas purification components. Three-way catalysts have a configuration provided with a substrate and a catalyst coating layer on the substrate in which a precious metal such as Rh, Pt or Pd is supported on a carrier particle. Among these precious metals, Rh mainly fulfills the role of reducing NOx while Pt and Pd mainly fulfill the role of oxidizing HC and CO.

In relation thereto, Patent Document 1 discloses an exhaust gas purification device having a catalyst layer on a substrate, the catalyst layer containing an alumina carrier particle supporting Pd and a ceria-zirconia carrier particle supporting Pt and/or Rh.

In Patent Document 1, as a result of supporting Pd on an alumina carrier particle having superior heat resistance, in addition to high catalytic activity being able to be maintained by inhibiting Pd particle growth, the oxygen concentration in the atmosphere can be adjusted by the ceria present in the zirconia-ceria carrier particle. As a result, it is reported that the NOx reduction reaction along with the CO and HC oxidation reactions are improved and exhaust gas purification performance can be improved.

CITATION LIST

Patent Document

Patent Document 1: JP2001-104786A

SUMMARY

Technical Problem

An object of the present invention is to provide an exhaust gas purification device having improved exhaust gas purification performance.

Solution to Problem

The inventors of the present invention found that the aforementioned problems can be solved by the means indicated below.

<<Aspect 1>>
An exhaust gas purification device, having a first catalyst layer containing a Pd-supporting catalyst supporting Pd on an alumina carrier particle, a first Rh-supporting catalyst supporting Rh on a first ceria-zirconia carrier particle, and a second ceria-zirconia carrier particle; wherein,
the ceria concentration in the first ceria-zirconia carrier particle is 30% by weight or less and the amount of ceria in the second ceria-zirconia carrier particle is larger than the amount of ceria in the first ceria-zirconia carrier particle.

<<Aspect 2>>
The exhaust gas purification device described in Aspect 1, wherein the ceria concentration in the second ceria-zirconia carrier particle is greater than 30% by weight.

<<Aspect 3>>
The exhaust gas purification device described in Aspect 1 or 2, wherein the first catalyst layer further contains barium sulfate.

<<Aspect 4>>
The exhaust gas purification device described in any of Aspects 1 to 3, having a second catalyst layer on the lower side of the first catalyst layer.

<<Aspect 5>>
The exhaust gas purification device described in Aspect 4, wherein the second catalyst layer contains barium sulfate.

<<Aspect 6>>
The exhaust gas purification device described in Aspect 4 or 5, wherein the second catalyst layer contains a second Rh-supporting catalyst supporting Rh on the first ceria-zirconia carrier particle.

<<Aspect 7>>
The exhaust gas purification device described in Aspect 6, wherein the ratio between the amount of Rh of the first Rh-supporting catalyst and the amount of Rh of the second Rh-supporting catalyst is within the range of 10:90 to 90:10.

<<Aspect 8>>
The exhaust gas purification device described in any of Aspects 4 to 7, further having one or more layers on the lower side of the second catalyst layer.

<<Aspect 9>
The exhaust gas purification device described in any of Aspects 1 to 3, wherein the first catalyst layer is present on a substrate.

<<Aspect 10>
The exhaust gas purification device described in any of Aspects 4 to 7, having the second catalyst layer between the first catalyst layer and the substrate.

<<Aspect 11>
The exhaust gas purification device described in Aspect 8, having the one or more layers between the second catalyst layer and the substrate.

Advantageous Effects of Invention

According to the present invention, an exhaust gas purification device can be provided that has improved exhaust gas purification performance.

DESCRIPTION OF EMBODIMENTS

<<Exhaust Gas Purification Device>>

The exhaust gas purification device of the present invention is an exhaust gas purification device having a first catalyst layer containing a Pd-supporting catalyst supporting Pd on an alumina carrier particle, a first Rh-supporting catalyst supporting Rh on first a ceria-zirconia carrier particle, and a second ceria-zirconia carrier particle, wherein the amount of ceria in the first ceria-zirconia carrier particle is 30% by weight or less, and the amount of ceria in the second ceria-zirconia carrier particle is larger than the amount of ceria in the first ceria-zirconia carrier particle.

Figure 1:
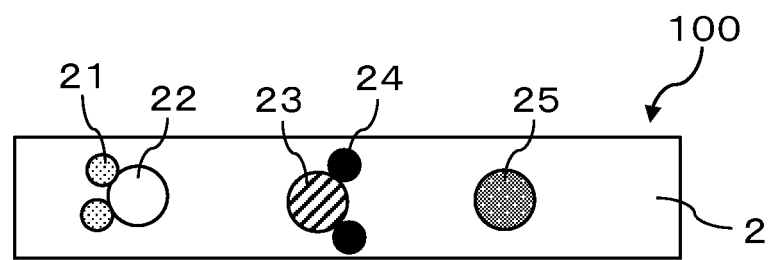
FIG. 1(a) is a conceptual drawing of an exhaust gas purification device showing one embodiment of the present invention.
FIG. 1(b) is a conceptual drawing of an exhaust gas purification device showing one embodiment of the present invention.
FIG. 1(c) is a conceptual drawing of an exhaust gas purification device of the prior art.
Figure 1:
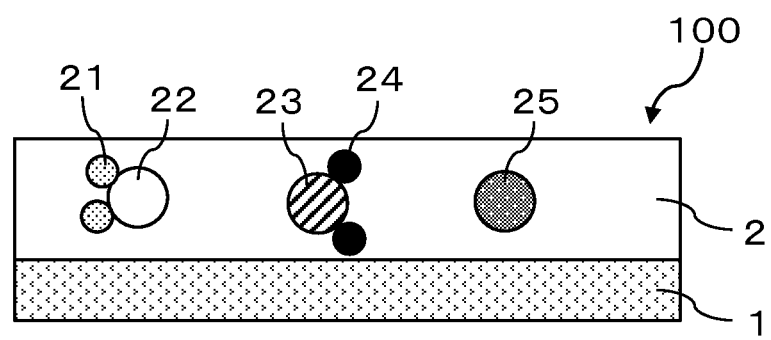
Figure 1:
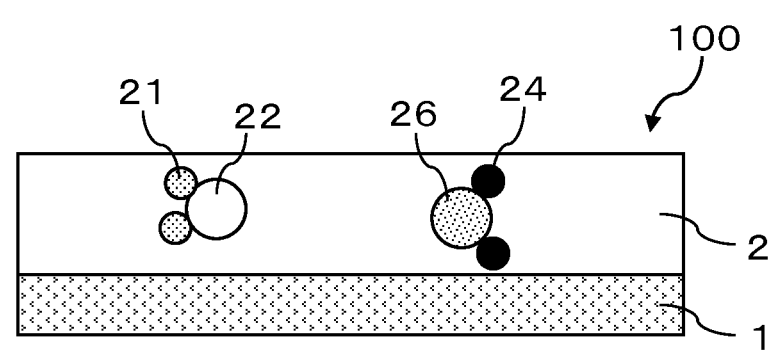

For example, as shown in FIG. 1(a), the exhaust gas purification device (100) of the present invention is the exhaust gas purification device (100) having a first catalyst layer (2) containing a Pd-supporting catalyst supporting Pd (21) on an alumina carrier particle (22), a first Rh-supporting catalyst supporting Rh (24) on a first ceria-zirconia carrier particle (23), and a second ceria-zirconia carrier particle (25). In addition, as shown in FIG. 1(b), the first catalyst layer (2) may be present on a substrate (1).

As shown in FIG. 1(c), Patent Document 1 discloses an exhaust gas purification device (100) having a catalyst layer (2) on a substrate (1), the catalyst layer (2) containing a Pd-supporting catalyst supporting Pd (21) on an alumina carrier particle (22), and an Rh-supporting catalyst supporting Rh (24) on a ceria-zirconia carrier particle (26). According to Patent Document 1, due to the effect of the alumina carrier particle (22) having superior heat resistance, in addition to being able to maintain high catalytic activity by inhibiting particle growth of the Pd (21), the oxygen concentration in the atmosphere can be adjusted by the ceria present in the ceria-zirconia carrier particle (26), and exhaust gas purification performance can be improved.

The exhaust gas purification device (100) of the aforementioned publication naturally contains a large amount of ceria in the ceria-zirconia carrier particle (26) supporting the Rh (24). The inventors of the present invention found that the larger the amount of ceria contained in the ceria-zirconia carrier particle (26) supporting the Rh (24), the greater the decrease in exhaust gas purification performance by the Rh, and as a result thereof, exhaust gas purification performance of the exhaust gas purification device (100) tends to gradually decrease.

Therefore, on the basis of this finding, the inventors of the present invention supported the Rh (24) on the first ceria-zirconia carrier particle (23) containing ceria at a low concentration, while also adding the second ceria-zirconia carrier particle (25) in order to ensure an adequate oxygen storage capacity (OSC performance) as shown in FIGS. 1(a) and 1(b). As a result, decreases in Rh activity attributable to ceria contained in the carrier particle supporting the Rh can be prevented, and since adequate OSC performance can be ensured, the exhaust gas purification device of the present invention is able to improve exhaust gas purification performance.

Furthermore, as shown in FIGS. 1(a) and 1(b), the exhaust gas purification device (100) of the present invention may further have a carrier supporting other precious metals, and may have, for example, alumina (22) supporting the Pd (21).

Figure 2:
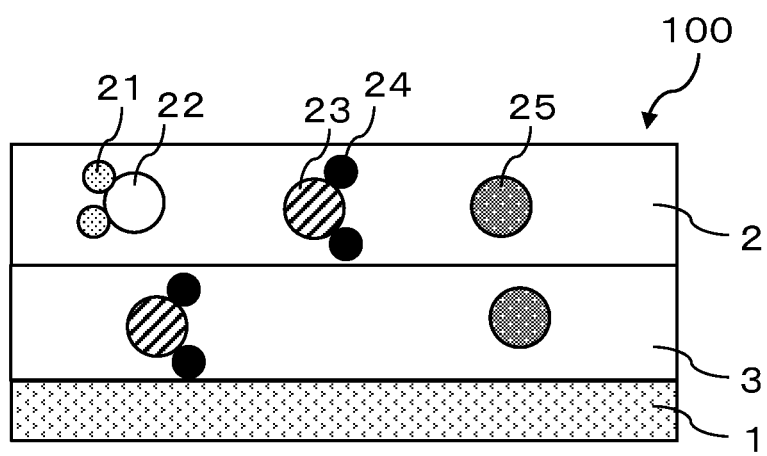
FIG. 2 is a conceptual drawing showing one embodiment of the exhaust gas purification device of the present invention.
Figure 2:
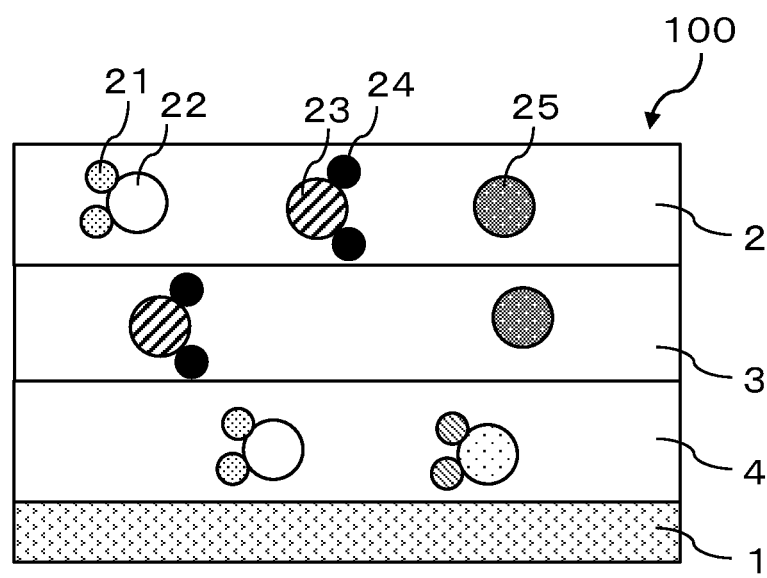

In addition, the exhaust gas purification device (100) of the present invention may also have a second catalyst layer (3), may further have a third catalyst layer (4), and may still further have additional catalyst layers on the lower side of the first catalyst layer (2). Here, an "upper side" or "lower side" refers to that determined based on the relationship in the case of considering the portion contacted by exhaust gas flow to be the uppermost side. For example, in an exhaust gas purification device having a substrate, the substrate is located farther towards the lower side than the catalyst layer. Moreover, the exhaust gas purification device (100) of the present invention may have the second catalyst layer (3) between the substrate (1) and the first catalyst layer (2) as shown in FIG. 2(a), may further have the third catalyst layer (4) as shown in FIG. 2(b), or may further still have additional catalyst layers. For example, an alumina particle and a ceria-zirconia carrier particle, which support Rh and contain ceria at a low concentration, may be present in the second catalyst layer (3), and for example, a carrier supporting Pt and/or Pd may be present in the third catalyst layer (4).

<First Catalyst Layer>

The first catalyst layer contains a Pd-supporting catalyst supporting Pd on an alumina carrier particle, a first Rh-supporting catalyst supporting Rh on a first ceria-zirconia carrier particle, and a second ceria-zirconia carrier particle.

The first catalyst layer may be a portion of a substrate containing a catalyst-supporting particle in the wall material thereof, such as a portion of a substrate like that described in JP2015-85241A, or may be present on such a substrate. In the case the first catalyst layer is a portion of a substrate, the first catalyst layer may compose a wall material of the substrate. In this case, an exhaust gas purification device may be obtained by using the Pd-supporting catalyst, the first Rh-supporting catalyst and the second ceria-zirconia carrier particle by mixing with an inorganic particle used during production of the substrate.

(Pd-Supporting Catalyst)

The Pd-supporting catalyst of the present invention is a catalyst in which Pd is supported on an alumina carrier particle. Pd has superior low-temperature activity and mainly fulfills the role of oxidizing HC and CO. Use of the exhaust gas purification device of the present invention containing Pd in the first catalyst layer makes it possible to efficiently purify exhaust gas even at low temperatures such as immediately after starting an internal combustion engine. In addition, since alumina is an oxide having superior heat resistance, supporting Pd on an alumina carrier particle makes it possible to prevent decreases in activity by inhibiting sintering of the Pd.

Particle, such as γ-alumina, β-alumina or silica-alumina particle can be selected for use as an alumina carrier particle. Among these, γ-alumina is used particularly preferably due to its superior adsorption properties and heat resistance.

An alumina carrier particle having a specific surface area of, for example, 30 $m^2/g$ or more, 50 $m^2/g$ or more, 100 $m^2/g$ or more, 150 $m^2/g$ or more or 200 $m^2/g$ or more and 2000 $m^2/g$ or less, 1000 $m^2/g$ or less, 800 $m^2/g$ or less, 500 $m^2/g$ or less, or 400 $m^2/g$ or less can be used for the alumina carrier particle from the viewpoint of supportability, heat resistance and structural stability.

Other porous carriers can be used in addition to the alumina carrier particle. Examples of other porous carriers include heat-resistant inorganic oxides typically used to support catalyst metals, examples of which include silica, zirconia and titania.

The supported amount of Pd may be 0.5 g or more, 1 g or more, 3 g or more or 5 g or more and 10 g or less, 9 g or less, 8 g or less or 7 g or less per 1 liter of substrate or exhaust gas purifying device. If the supported amount of Pd is below this range, CO and HC purification rates may decrease, while if the supported amount of Pd exceeds this range, the effect thereof becomes saturated resulting in increased costs.

The Pd-supporting catalyst of the present invention can be obtained by the following process. An alumina carrier particle are dispersed in water to prepare a dispersion. An aqueous solution containing a Pd salt is further added to this dispersion followed by mixing well, drying and calcining to obtain a Pd-supporting catalyst in which Pd is supported on an alumina carrier particle. Examples of Pd salts able to be used here include palladium nitrate, palladium chloride and other water-soluble salts.

The drying temperature in the aforementioned Pd-supporting catalyst preparation method is, for example, 70° C. or higher, 80° C. or higher or 90° C. or higher and 150° C. or lower, 120° C. or lower, 110° C. or lower or 100° C. or lower. In addition, the calcination temperature is, for example, 300° C. or higher, 400° C. or higher or 500° C. or higher and 1500° C. or lower, 1300° C. or lower or 1100° C. or lower. Calcination time is 1 hour or more, 2 hours or more or 4 hours or more and 10 hours or less or 8 hours or less.

(First Rh-Supporting Catalyst)

The first Rh-supporting catalyst of the present invention is a catalyst in which Rh is supported on a first ceria-zirconia carrier particle. Rh mainly fulfills the role of reducing NOx. The first ceria-zirconia carrier particle consist of a material that demonstrates OSC performance, and are known to demonstrate extremely superior OSC performance particularly as a result of supporting a precious metal such as Rh. Use of the exhaust gas purification device of the present invention containing an Rh-supporting catalyst in the first catalyst layer makes it possible to efficiently purify exhaust gas.

The first ceria-zirconia composite oxide refers to a composite oxide in which ceria and zirconia are in the state of a solid solution. It may contain alkaline earth metal elements or rare earth elements (excluding Ce and Zr) and the like. Examples of alkaline earth metal elements include beryllium (Be), magnesium (Mg), calcium (Ca), strontium (Sr) and barium (Ba). In addition, examples of rare earth elements (excluding Ce and Zr) include scandium (Sc), yttrium (Y), lanthanum (La), praseodymium (Pr), neodymium (Nd) and promethium (Pm).

The inventors of the present invention found that exhaust gas purification performance conversely decreases in the case of a large amount of ceria in the first ceria-zirconia composite oxide supporting Rh. Consequently, on the basis of this finding, the ceria concentration in the first ceria-zirconia carrier particle is low, and more specifically, 30% by weight or less, 25% by weight or less, 20% by weight or less, 15% by weight or less, 10% by weight or less or 5% by weight or less.

The first ceria-zirconia carrier particle can be prepared by, for example, co-precipitation. Co-precipitation consists of preparing a salt solution containing Ce, Zr, and alkaline earth metal elements or rare earth elements (excluding Ce and Zr) as necessary, at a prescribed stoichiometric ratio, adding a neutralizer to this solution, and co-precipitating the salt containing Ce, Zr, and alkaline earth metal elements or rare earth elements (excluding Ce and Zr) as necessary, followed by subjecting this re-precipitate to heat treatment at, for example 400° C. to 1000° C. to prepare the first ceria-zirconia carrier particle.

Examples of salts of each element include inorganic salts such as sulfates, nitrates, chlorides or phosphates, and organic acid salts such as acetates or oxalates. In addition, examples of neutralizers include organic bases such as ammonia or amines such as triethylamine or pyridine, and inorganic bases such as sodium hydroxide, potassium hydroxide, sodium carbonate, potassium carbonate, ammonium carbonate or ammonium hydroxide. Preferable examples of neutralizers include ammonium hydroxide and more preferable examples include aqueous ammonium hydroxide solution. Furthermore, neutralizer is added so that the pH of the solution following addition of the neutralizer is about 6 to 10.

The supported amount of Rh is 0.01 g or more, 0.02 g or more, 0.05 g or more, 0.1 g or more or 0.5 g or more and 5 g or less, 4 g or less, 3 g or less, 2 g or less or 1 g or less per 1 liter of substrate or exhaust gas purification device. If the supported amount of Rh is below this range, NOx purification rate may decrease, while if the supported amount of Rh exceeds this range, the effect thereof becomes saturated resulting in increased costs.

The first Rh-supporting catalyst of the present invention can be obtained according to the same process as that used to obtain the aforementioned Pd-supporting catalyst.

(Second Ceria-Zirconia Carrier Particle)

Due to the low ceria concentration in the first ceria-zirconia carrier particle, in the case of a configuration consisting only of Pd-supporting catalyst and Rh-supporting catalyst, OSC performance is inadequate resulting in the occurrence of the problem of poor exhaust gas purification performance. Consequently, the second ceria-zirconia carrier particle are added to the first catalyst layer in order to ensure adequate OSC performance. For example, a second ceria-zirconia carrier particle can be used that are not supporting a precious metal and the like.

The second ceria-zirconia carrier particle may employ the same configuration as the first ceria-zirconia carrier particle and can be produced by the same method (such as co-precipitation). However, since the second ceria-zirconia carrier particle are added to the first catalyst layer in order to compensate for inadequate OSC performance, the ceria concentration of the second ceria-zirconia carrier particle is preferably high, and is, for example, greater than 30% by weight, 40% by weight or more, 50% by weight or more or 60% by weight or more and 95% by weight or less, 90% by weight or less, 80% by weight or less or 70% by weight or less.

In addition, from the viewpoint of ensuring an adequate amount of ceria in the entire first catalyst layer while curtailing the amount of ceria contained the first ceria-zirconia carrier particle supporting Rh, the amount of ceria in the second ceria-zirconia carrier particle is larger than the amount of ceria in the first ceria-zirconia carrier particle. For example, the ratio to the amount of ceria in the first ceria-zirconia carrier particle to the amount of ceria in the second ceria-zirconia carrier particle is 45:55 to 40:60, 40:60 to 30:70, 30:70 to 20:80, 20:80 to 10:90 or 10:90 to 5:95.

(Co-Catalyst)

The first catalyst layer may also contain one or more types of co-catalyst components having a composition differing from that of the Pd-supporting catalyst, Rh-supporting catalyst and a second ceria-zirconia carrier particle in order to further improve exhaust gas purification performance. For example, at least one type of element selected from the group consisting of barium, calcium, cesium, potassium, magnesium and lanthanum can be contained in the first catalyst layer in the form of a nitrate, acetate or sulfate, and barium sulfate ($BaSO_4$) in particular can be contained. As a result, poisoning of Pd by HC and other substances contained in exhaust gas can be prevented and exhaust gas purification performance can be further improved.

<Substrate>

There are no particular limitations on the substrate and any arbitrary material typically used in an exhaust gas purification device can be used. More specifically, a honeycomb-shaped material having a large number of cells can be used for the substrate, and for example, heat-resistant ceramic materials such as cordierite ($2MgO.2Al_2O_3.5SiO_2$), alumina, zirconia or silicon carbide or metal materials composed of metal foil such as stainless steel can be used. In addition, as was previously described, the first catalyst layer may be a portion of a substrate containing catalyst carrier particle in the wall material thereof, such as a portion of the substrate described in JP2015-85241A.

<Second Catalyst Layer>

The second catalyst layer is an optional catalyst layer which may be present on the lower side of the aforementioned first catalyst layer. The second catalyst layer may be a portion of a substrate containing a catalyst carrier particle in the wall material thereof such as a portion of the substrate described in JP2015-85241A, or the second catalyst layer may compose the wall surface of such a substrate. In this case, the first catalyst layer may be present on the second catalyst layer serving as the substrate. In addition, in the case the second catalyst layer is a portion of a substrate, the Rh-supporting catalyst is used by mixing with an inorganic particle used during production of the substrate to obtain an exhaust gas purification device, or the second catalyst layer may support Rh by wash-coating a substrate containing a catalyst carrier particle such as a ceria-zirconia particle in the wall surface thereof.

The second catalyst layer may have the same configuration as the first catalyst layer, and can contain a Pd-supporting catalyst supporting Pd on an alumina carrier particle, a second Rh-supporting catalyst supporting Rh on a first ceria-zirconia carrier particle, and a second ceria-zirconia carrier particle. In addition, the second catalyst layer can contain one or more types of the aforementioned co-catalyst components in the same manner as the first catalyst layer.

The second catalyst layer preferably does not contain Pd-supporting catalyst and a second ceria-zirconia carrier particle in order to reduce the total amount of precious metal contained in the exhaust gas purification device of the present invention and lower raw material costs. This is because HC and CO purification as well as OSC performance are adequately ensured by the first catalyst layer.

On the other hand, since reduction of NOx takes place by a multistage reaction, a large number of adsorption reaction fields are required in the catalyst layer. Consequently, the second catalyst layer preferably contains the second Rh-supporting catalyst. The second Rh-supporting catalyst is essentially the same as the first Rh-supporting catalyst, and is a catalyst that is obtained by supporting Rh on the first ceria-zirconia carrier particle.

The ratio between the amount of Rh of the first Rh-supporting catalyst and the amount of Rh of the second Rh-supporting catalyst is 10:90 to 90:10, 10:90 to 20:80, 20:80 to 30:70, 30:70 to 40:60, 40:60 to 50:50, 50:50 to 60:40, 60:40 to 70:30, 70:30 to 80:20 or 80:20 to 90:10, and preferably the ratio between the amount of Rh of the first Rh-supporting catalyst and the amount of Rh of the second Rh-supporting catalyst is 50:50 to 60:40, 60:40 to 70:30, 70:30 to 80:20 or 80:20 to 90:10.

In addition, the exhaust gas purification device of the present invention can further have one or more of catalyst layers on the lower side of the second catalyst layer.

<Method for Producing Exhaust Gas Purification Device>

The exhaust gas purification device having the configuration described above can be produced according to a production process similar to that used in the prior art. For example, in the case the first catalyst layer composes a portion of the wall of a substrate as shown in FIG. 1(a), the exhaust gas purification device may be obtained by using the Pd-supporting catalyst, first Rh-supporting catalyst and a second ceria-zirconia carrier particle by mixing with an inorganic particle used during production of the substrate. In the case of producing an exhaust gas purification device of the single layer structure type having only the first catalyst layer on a substrate as shown in FIG. 1(b), a slurry containing the Pd-supporting catalyst, Rh-supporting catalyst and a second ceria-zirconia carrier particle is first coated onto a substrate by a known wash coating method. Subsequently, the slurry is dried at a prescribed temperature and for a prescribed amount of time followed by calcination to produce an exhaust gas purification device having a first catalyst layer on a substrate.

In addition, in the case of producing an exhaust gas purification device of the two-layer structure type having a first catalyst layer and a second catalyst layer, the second catalyst layer is first formed on a substrate or a substrate containing the second catalyst layer in the form of a catalyst carrier particle in a wall surface thereof is used in the manner of the substrate described in, for example, JP2015-85241A, followed by forming the first catalyst layer. More specifically, in the case of the aspect shown in FIG. 1(b), a desired component for use in the second catalyst layer is used by mixing with other inorganic particle used during production of the substrate to obtain a substrate in which the second catalyst layer constitutes a portion thereof. Subsequently, a slurry for the first catalyst layer is coated onto the substrate according to a known wash coating method followed by drying and calcination. In addition, in the case of the aspect shown in FIG. 1(b), a slurry for the second catalyst layer containing a desired component is coated on the surface of a substrate according to a known wash coating method. Next, a slurry for the first catalyst layer containing the Pd-supporting catalyst, Rh-supporting catalyst and a second ceria-zirconia carrier particle is layer-coated onto the surface of the second catalyst layer according to a known wash coating method. This is followed by baking and calcining at a prescribed temperature and for a prescribed amount of time. The layer structure is not limited to two layers but may also consist of three or more layers. Alternatively, instead of this single calcination process, a two-stage calcination process may be employed in which the second catalyst layer is first formed by carrying out drying and calcination after having coated the slurry for the second catalyst layer on the surface of the substrate, followed by coating the slurry for the first catalyst layer on the surface of the second catalyst layer, and then drying and calcining to form the first catalyst layer.

Although there are no particular limitations on the calcination conditions of the wash-coated slurry, a target catalyst layer can typically be formed by carrying out calcination at a temperature of 400° C. to 1000° C. for about 1 hour to 4 hours. Furthermore, although there are no particular limitations on drying conditions prior to calcination, drying is preferably carried out at a temperature of 80° C. to 300° C. for about 1 hour to 12 hours.

In addition, the slurry preferably contains a binder in the case of forming a catalyst layer by this type of wash coating method since the slurry is preferably adhered to the surface of the substrate, or on the surface of the lower layer in the case of a plurality of catalyst layers having a layered structure. An alumina sol or silica sol, for example, is preferably used for the target binder. Furthermore, the viscosity of the slurry is suitably adjusted so as to able to easily flow into the cells of the substrate (such as a honeycomb substrate).

EXAMPLES

Although the following provides a detailed explanation of the present invention through examples thereof, the technical scope of the present invention is not limited thereto.

<<Preparation of Single-Layer Exhaust Gas Purification Device>>

Example 1

A first ceria-zirconia (CZ)-based composite oxide ($CeO_2/ZrO_2/La_2O_3/Nd_2O_3=20/70/5/5$ (wt %)) (indicated as CZLN1) (25 g) and rhodium nitrate solution (5% by weight as elemental Rh) (4 g) were added to 100 ml of ion exchange water followed by stirring for 60 minutes. After drying at 110° C., the mixture was calcined in air for 1 hour at 500° C. to obtain Rh-supporting powder I.

Next, alumina (50 g) and palladium nitrate solution (5% by weight as elemental Pd) (20 g) were added to 200 ml of ion exchange water followed by stirring for 60 minutes. After drying at 110° C., the mixture was calcined in air for 1 hour at 500° C. to obtain Pd-supporting alumina 1.

The Pd-supporting alumina I (51 g) (containing 1 g of elemental Pd), the Rh-supporting powder I (25.2 g) (containing 0.2 g of elemental Rh) and the second ceria-zirconia (CZ)-based composite oxide ($CeO_2/ZrO_2/La_2O_3/Nd_2O_3=40/55/5$ (wt %)) (indicated as CZLN1) (25 g) were mixed to prepare a slurry. 100.2 g of this slurry (containing 1 g of elemental Pd and 0.2 g of elemental Rh) were coated onto a honeycomb monolith substrate (total length: 100 mm, volume: 1.0 L, number of cells: 900 cells/in$^2$) and dried for 1 hour at 250° C. followed by calcining for 1 hour at 500° C. to prepare the exhaust gas purification device of Example 1.

Example 2

The exhaust gas purification device of Example 2 was obtained using the same method as Example 1 with the exception of changing the type of the first CZ-based composite oxide, changing the amount of alumina, and not using a second CZ-based composite oxide.

<<Preparation of Two-Layer Exhaust Gas Purification Device—Study of Supported Amount of Rh>>

Example 3

Rh-supporting powder II was obtained in the same manner as Rh-supporting powder I with the exception of changing the supported amount of Rh to 0.18 g.

Rh-supporting powder II (25.18 g) (containing 0.18 g of elemental Rh) and alumina (75 g) were mixed to prepare a slurry. 100.1 g of this slurry (containing 0.1 g of elemental Rh) were coated onto a honeycomb monolith substrate (total length: 100 mm, volume: 1.0 L, number of cells: 900 cells/in$^2$) and dried for 1 hour at 250° C. followed by calcining for 1 hour at 500° C. to prepare an exhaust gas purification device having a first catalyst layer.

Rh-supporting powder III was obtained in the same manner as Rh-supporting powder II with the exception of changing the supported amount of Rh to 0.02 g.

The Pd-supporting alumina used in Example 1 (51 g) (containing 1 g of elemental Pd), the Rh-supporting powder III (25.02 g) (containing 0.02 g of elemental Rh) and the ceria-zirconia-based composite oxide CZL1 (25 g) were mixed to prepare a slurry. 101.12 g of this slurry (containing 1 g of elemental Pd and 0.02 g of elemental Rh) were coated onto the aforementioned exhaust gas purification device having the first catalyst layer and dried for 1 hour at 250° C. followed by calcining for 1 hour at 500° C. to prepare the exhaust gas purification device of Example 3 having a having a first catalyst layer and a second catalyst layer.

Examples 4 to 8

Exhaust gas purification devices of Examples 4 to 7 having the configurations shown in the following Table 1 were obtained using the same method as Example 3 with the exception of changing the proportions of supported Rh in the first catalyst layer and second catalyst layer without changing the total amount of supported Rh. In addition, the exhaust gas purification device of Example 8 was obtained using the same method as Example 3 with the exception of not supporting Rh on the first catalyst layer and changing the supported amount of Rh of the second catalyst layer.

<<Preparation of Two-Layer Exhaust Gas Purification Device—Study of Type of First CZ-Based Composite Oxide>>

Examples 9 to 14

Exhaust gas purification devices of Examples 9 to 14 having the configurations shown in the following Table 2 were obtained using the same method as Example 5 with the exception of changing the type of first CZ-based composite oxide.

<<Production of Two-Layer Exhaust Gas Purification Device—Study of Type of Second CZ-Based Composite Oxide>>

Examples 15 to 18

Exhaust gas purification devices of Examples 15 to 17 having the configurations shown in the following Table 3 were obtained using the same method as Example 5 with the exception of changing the type of second CZ-based composite oxide of the first catalyst layer. The second CZ-based composite oxide of the first catalyst layer was not used in Example 18.

<<Preparation of Two-Layer Exhaust Gas Purification Catalyst—Study of Barium Sulfate>>

Example 19

The exhaust gas purification catalyst of Example 19 as shown in the following Table 4 was obtained using the same method as Example 5.

<<Preparation of Three-Layer Exhaust Gas Purification Catalyst>>

Example 20

(1) Alumina (25 g) and palladium nitrate solution (5% by weight as elemental Pd) (1 g) were added to 100 ml of ion exchange water followed by stirring for 60 minutes. After drying at 110° C., the mixture was calcined in air for 1 hour at 500° C. to obtain Pd-supporting alumina II.

(2) A ceria-zirconia (CZ)-based composite oxide ($ZrO_2/(CeO_2/La_2O_3/Y_2O_3=75/15/5/5$ (wt %)) (indicated as CZLY) (25 g) and dinitrodiamine Pt nitrate solution (5% by weight as elemental Pt) (1 g) were added to 100 ml of ion exchange water followed by stirring for 60 minutes. After drying at 110° C., the mixture was calcined in air for 1 hour at 500° C. to obtain a Rh-supporting CZ carrier.

(3) Pd-supporting alumina II (25.05 g) (containing 0.05 g of elemental Pd) and the Pt-supporting CZ carrier (25.05 g) (containing 0.05 g of elemental Pt) were mixed to prepare a slurry. 50.1 g of this slurry (containing 0.05 g of elemental Pd and 0.05 g of elemental Pt) were coated onto a honeycomb monolith substrate (total length: 100 mm, volume: 1.0 L, number of cells: 900 cells/in$^2$) and dried for 1 hour at 250° C. followed by calcining for 1 hour at 500° C. to prepare an exhaust gas purification having a first catalyst layer.

(4) The Rh-supporting powder I used in Example 1 (25.1 g) (containing 0.1 g of elemental Rh) and alumina (75 g) were mixed to prepare a slurry. 100.1 of this slurry (containing 0.1 g of elemental Rh) were coated onto the exhaust gas purification device obtained in (3) followed by drying for 1 hour at 250° C. and calcining for 1 hour at 500° C. to obtain an exhaust gas purification device having a first catalyst layer and a second catalyst layer.

(5) Next, alumina (50 g) and palladium nitrate solution (5% by weight as Pd) (20 g) were added to 200 ml of ion exchange water followed by stirring for 60 minutes. After drying at 110° C., the mixture was calculated in air for 1 hour at 500° C. to obtain Pd-supporting alumina III.

(6) The Pd-supporting alumina III (51 g) (containing 1 g as elemental Pd), Rh-supporting powder I (25.1 g) (containing 0.1 g as elemental Rh) and ceria-zirconia-based composite oxide CZL1 (25 g) were mixed to prepare a slurry. 101.1 g of this slurry (containing 1 g of elemental Pd and 0.1 of elemental Rh) were coated onto the exhaust gas purification device obtained in (4) followed by drying for 1 hour at 250° C. and calcining for 1 hour at 500° C. to obtain the exhaust gas purification device of Example 20.

Example 21

The exhaust gas purification device of Example 21 having the configuration shown in the following Table 4 was obtained using the same method as Example 20 with the exception of changing the configurations of the second catalyst layer and third catalyst layer.

<<Preparation of Two-Layer Exhaust Gas Purification Device—Modification of CZ Carrier of Second Catalyst Layer>>

Examples 22 and 23

Exhaust gas purification devices of Examples 22 and 23 having the configurations shown in the following Table 4 were obtained using the same method as Example 5 with the exception of changing the CZ carrier of the second catalyst layer.

<<Evaluation Methods>>

[Durability Performance Test]

A durability test equivalent to traveling for 80,000 km was carried out on the exhaust gas purification devices. Subsequently, the exhaust gas purification devices were installed in an actual vehicle equipped with an engine having a displacement of 1.0 L followed by operating in the JC08 mode and measuring NOx emissions. The results are shown in Table 1. Furthermore, the values in Table 1 indicate combined values of a cold evaluation and hot evaluation in the JC08 mode.

[Pd—Rh Alloying Rate Evaluation Method]

The durable exhaust gas purification devices of Examples 2 and 5 were scraped off followed by measuring the characteristic X-ray intensities of Pd and Rh contained therein with a scanning electron microscope (SEM-EDX). In these measurements, the exhaust gas purification devices were observed at a magnification factor of 150,000×. In the case of designating the measured value of elemental Pd as "Pd" and the measured value of elemental Rh as "Rh", the Pd—Rh alloying rates were calculated according to the calculation formula indicated below.

$$\text{Pd—Rh alloying rate (\%)}=\text{Rh}/(\text{Pd}+\text{Rh})\times 100$$

SEM-EDX measurement of Pd and Rh was repeated and analyzed for 100 measurement points to determine the average value of the Pd—Rh alloying rate in the form of a representative value.

<<Results>>

The results are shown in Tables 1 to 4.

As can be understood from Table 1, exhaust gas purification performance improved in Example 1, in which the ceria concentration in the first ceria-zirconia carrier particle is high, the ceria concentration in the first ceria-zirconia carrier particle is lower in comparison with Example 2 having a large amount of ceria contained therein, the amount of ceria contained therein is reduced and the second ceria-zirconia carrier particle were added.

In addition, exhaust gas purification performance further improved in Examples 3 to 7 employing a two-layer structure and having an Rh-supporting catalyst in the first catalyst layer and second catalyst layer in comparison with Example 1 having only a first catalyst layer.

In addition, exhaust gas purification performance improved in Examples 3 to 7, having an Rh-supporting catalyst in the first catalyst layer and second catalyst layer, in comparison with Example 8, which although employs a two-layer structure, does not have an Rh-supporting catalyst in the first catalyst layer.

In addition, as can be understood from Table 2, exhaust gas purification performance improved in Example 5, in which Rh was supported on the first ceria-zirconia carrier particle, in comparison with Example 13, in which Rh was supported on alumina.

In addition, exhaust gas purification performance improved in Examples 5 and 9 to 12, which have a low ceria concentration in the first ceria-zirconia carrier particle, in comparison with Example 14, in which the ceria concentration in the first ceria-zirconia carrier particle is high, and exhaust gas purification performance improved more the lower the ceria concentration in the first ceria-zirconia carrier particle.

In addition, as can be understood from Table 3, exhaust gas purification performance improved in Examples 5 and 15 to 16, in which the amount of ceria in the second ceria-zirconia carrier particle is larger than the amount of ceria in the first ceria-zirconia carrier particle in the first catalyst layer, in comparison with Example 17, in which the amount of ceria in the first ceria-zirconia carrier particle and the amount of ceria in the second ceria-zirconia carrier particle are the same. In addition, exhaust gas purification performance improved in Example 5, which contains the second ceria-zirconia carrier particle in the first catalyst layer, in comparison with Example 18, which does not contain the second ceria-zirconia carrier particle in the first catalyst layer.

As can be understood from Table 4, exhaust gas purification performance further improved in Example 19, which contains barium sulfate, in comparison with Example 5, which does not contain barium sulfate.

In addition, exhaust gas purification performance further improved in Example 20, which employs a three-layer structure, in comparison with Example 5, which employs a two-layer structure.

Moreover, exhaust gas purification performance further improved in Examples 5 and 22, in which Rh is supported on the first ceria-zirconia carrier particle in the second catalyst layer, in comparison with Example 23, in which Rh is supported on an alumina carrier particle in the second catalyst layer.

TABLE 1

| | First catalyst layer | | | | | Second catalyst layer | | | | | | |
| --- | --- | --- | --- | --- | --- | --- | --- | --- | --- | --- | --- | --- |
| | | Ceria concentration, Amount of ceria | | | Amount of Rh (A) | | Ceria concentration, Amount of ceria | | Amount of Rh (B) | | Emission Values | | PdRh Alloying Rate (%) |
| Ex | Layer Configuration | 1st CZ carrier | 2nd CZ carrier | Total ceria | | Layer Configuration | 1st CZ carrier | Total ceria | | A:B | NMHC (g/km) | NOx (g/km) | |
| Ex1 | Pd(1)/Al2O3(50), Rh(0.2)/CZLN1(25), CZL1(25) | 20 wt % 5 g/L | 40 wt % 10 g/L | 15 g/L | 0.2 g/L | — | — | — | — | 100:0 | 0.011 | 0.012 | 9 |
| Ex2 | Pd(1)/Al2O3(78.5), Rh(0.2)/CZY(21.5) | 70 wt % 15 g/L | — | 15 g/L | 0.2 g/L | — | — | — | — | 100:0 | 0.026 | 0.031 | 30 |
| Ex3 | Pd(1)/Al2O3(50), Rh(0.18)/CZLN1(25), CZL1(25) | 20 wt % 5 g/L | 40 wt % 10 g/L | 15 g/L | 0.18 g/L | Rh(0.02)/CZLN1(25), Al2O3(75) | 20 wt % 5 g/L | 5 g/L | 0.02 g/L | 90:10 | 0.010 | 0.011 | — |
| Ex4 | Pd(1)/Al2O3(50), Rh(0.14)/CZLN1(25), CZL1(25) | 20 wt % 5 g/L | 40 wt % 10 g/L | 15 g/L | 0.14 g/L | Rh(0.06)/CZLN1(25), Al2O3(75) | 20 wt % 5 g/L | 5 g/L | 0.06 g/L | 70:30 | 0.008 | 0.008 | — |
| Ex5 | Pd(1)/Al2O3(50), Rh(0.1)/CZLN1(25), CZL1(25) | 20 wt % 5 g/L | 40 wt % 10 g/L | 15 g/L | 0.10 g/L | Rh(0.1)/CZLN1(25), Al2O3(75) | 20 wt % 5 g/L | 5 g/L | 0.1 g/L | 50:50 | 0.010 | 0.010 | 8 |
| Ex6 | Pd(1)/Al2O3(50), Rh(0.06)/CZLN1(25), CZL1(25) | 20 wt % 5 g/L | 40 wt % 10 g/L | 15 g/L | 0.06 g/L | Rh(0.14)/CZLN1(25), Al2O3(75) | 20 wt % 5 g/L | 5 g/L | 0.14 g/L | 30:70 | 0.010 | 0.011 | — |
| Ex7 | Pd(1)/Al2O3(50), Rh(0.02)/CZLN1(25), CZL1(25) | 20 wt % 5 g/L | 40 wt % 10 g/L | 15 g/L | 0.02 g/L | Rh(0.18)/CZLN1(25), Al2O3(75) | 20 wt % 5 g/L | 5 g/L | 0.18 g/L | 10:90 | 0.011 | 0.011 | — |
| Ex8 | Pd(1)/Al2O3(50), CZL1(50) | — | 40 wt % 20 g/L | 20 g/L | — | Rh(0.2)/CZLN1, Al2O3 | 20 wt % 5 g/L | 5 g/L | 0.2 g/L | 0:100 | 0.016 | 0.019 | — |

CZLN1 = $CeO_2/ZrO_2/La_2O_3/Nd_2O_3$ = 20/70/5/5 (wt %)
CZL1 = $CeO_2/ZrO_2/La_2O_3$ = 40/55/5 (wt %)
CZY = $CeO_2/ZrO_2/Y_2O_3$ = 70/25/5 (wt %)

45

TABLE 2

| | First catalyst layer | | | | | Second catalyst layer | | | | | | |
| --- | --- | --- | --- | --- | --- | --- | --- | --- | --- | --- | --- | --- |
| | | Ceria concentration, Amount of ceria | | | Amount of Rh (A) | | Ceria concentration, Amount of ceria | | Amount of Rh (B) | | | | PdRh Alloying rate (%) |
| Ex | Layer configuration | 1st CZ carrier | 2nd CZ carrier | Total ceria | | Layer configuration | CZ carrier | Total ceria | | A:B | NMHC (g/km) | NOx (g/km) | |
| Ex9 | Pd(1)/Al2O3(50), Rh(0.1)/ZLN(25), CZL1(25) | (ZLN carrier) | 40 wt % 10 g/L | 10 g/L | 0.1 g/L | Rh(0.1)/ZLN(25), Al2O3(75) | (ZLN carrier) | — | 0.1 g/L | 50:50 | 0.008 | 0.009 | — |
| Ex10 | Pd(1)/Al2O3(50), Rh(0.1)/CZLN5(25), CZL1(25) | 5 wt % 1.25 g/L | 40 wt % 10 g/L | 11.25 g/L | 0.1 g/L | Rh(0.1)/CZLN5(25), Al2O3(75) | 5 wt % 1.25 g/L | 1.25 g/L | 0.1 g/L | 50:50 | 0.009 | 0.008 | — |

TABLE 2-continued

| | First catalyst layer | | | | Second catalyst layer | | | | | | | |
|---|---|---|---|---|---|---|---|---|---|---|---|---|
| | | Ceria concentration, Amount of ceria | | | | | Ceria concentration, Amount of ceria | | | | | PdRh Alloying rate (%) |
| Ex | Layer configuration | 1st CZ carrier | 2nd CZ carrier | Total ceria | Amount of Rh (A) | Layer configuration | CZ carrier | Total ceria | Amount of Rh (B) | A:B | NMHC (g/km) | NOx (g/km) | |
| Ex11 | Pd(1)/Al2O3(50), Rh(0.1)/CZLN4(25), CZL1(25) | 10 wt % 2.5 g/L | 40 wt % 10 g/L | 12.5 g/L | 0.1 g/L | Rh(0.1)/CZLN4(25), Al2O3(75) | 10 wt % 2.5 g/L | 2.5 g/L | 0.1 g/L | 50:50 | 0.010 | 0.009 | — |
| Ex5 | Pd(1)/Al2O3(50), Rh(0.1)/CZLN1(25), CZL1(25) | 20 wt % 5 g/L | 40 wt % 10 g/L | 15 g/L | 0.1 g/L | Rh(0.1)/CZLN1(25), Al2O3(75) | 20 wt % 5 g/L | 5 g/L | 0.1 g/L | 50:50 | 0.010 | 0.010 | 8 |
| Ex12 | Pd(1)/Al2O3(50), Rh(0.1)/CZLN3(25), CZL1(25) | 30 wt % 7.5 g/L | 40 wt % 10 g/L | 17.5 g/L | 0.1 g/L | Rh(0.1)/CZLN3(25), Al2O3(75) | 30 wt % 7.5 g/L | 7.5 g/L | 0.1 g/L | 50:50 | 0.011 | 0.012 | — |
| Ex13 | Pd(1)/Al2O3(50), Rh(0.1)/Al2O3(25), CZL1(25) | (Al2O3 carrier) | 40 wt % 10 g/L | 10 g/L | 0.1 g/L | Rh(0.1)/CZLN1(25), Al2O3(75) | 20 wt % 5 g/L | 5 g/L | 0.1 g/L | 50:50 | 0.017 | 0.018 | — |
| Ex14 | Pd(1)/Al2O3(50), Rh(0.1)/CZLN2(25), CZL1(25) | 40 wt % 10 g/L | 40 wt % 10 g/L | 20 g/L | 0.1 g/L | Rh(0.1)/CZLN2(25), Al2O3(75) | 40 wt % 10 g/L | 10 g/L | 0.1 g/L | 50:50 | 0.014 | 0.014 | — |

CZLN1 = $CeO_2/ZrO_2/La_2O_3/Nd_2O_3$ = 20/70/5/5 (wt %)
CZLN2 = $CeO_2/ZrO_2/La_2O_3/Nd_2O_3$ = 40/50/5/5 (wt %)
CZLN3 = $CeO_2/ZrO_2/La_2O_3/Nd_2O_3$ = 30/60/5/5 (wt %)
CZLN4 = $CeO_2/ZrO_2/La_2O_3/Nd_2O_3$ = 10/80/5/5 (wt %)
CZLN5 = $CeO_2/ZrO_2/La_2O_3/Nd_2O_3$ = 5/85/5/5 (wt %)
ZLN = $ZrO_2/La_2O_3/Nd_2O_3$ = 90/5/5 (wt %)
CZL1 = $CeO_2/ZrO_2/La_2O_3$ = 40/55/5 (wt %)

TABLE 3

| | First catalyst layer | | | | Second catalyst layer | | | | | | | |
|---|---|---|---|---|---|---|---|---|---|---|---|---|
| | | Ceria concentration, Amount of ceria | | | | | Ceria concentration, Amount of ceria | | | | Emission values | | PdRh Alloying rate (%) |
| Ex | Layer configuration | 1st CZ carrier | 2nd CZ carrier | Total ceria | Amount of Rh (A) | Layer configuration | CZ carrier | Total ceria | Amount of Rh (B) | A:B | NMHC (g/km) | NOx (g/km) | |
| Ex5 | Pd(1)/Al2O3(50), Rh(0.1)/CZLN1(25), CZL1(25) | 20 wt % 5 g/L | 40 wt % 10 g/L | 15 g/L | 0.1 g/L | Rh(0.1)/CZLN1(25), Al2O3(75) | 20 wt % 5 g/L | 5 g/L | 0.1 g/L | 50:50 | 0.010 | 0.010 | 8 |
| Ex15 | Pd(1)/Al2O3(50), Rh(0.1)/CZLN1(25), CZL3(25) | 20 wt % 5 g/L | 60 wt % 15 g/L | 20 g/L | 0.1 g/L | Rh(0.1)/CZLN1(25), Al2O3(75) | 20 wt % 5 g/L | 5 g/L | 0.1 g/L | 50:50 | 0.010 | 0.010 | — |
| Ex16 | Pd(1)/Al2O3(50), Rh(0.1)/CZLN1(25), CZL4(25) | 20 wt % 5 g/L | 80 wt % 20 g/L | 25 g/L | 0.1 g/L | Rh(0.1)/CZLN1(25), Al2O3(75) | 20 wt % 5 g/L | 5 g/L | 0.1 g/L | 50:50 | 0.010 | 0.012 | — |
| Ex17 | Pd(1)/Al2O3(50), Rh(0.1)/CZLN1(25), CZL2(25) | 20 wt % 5 g/L | 20 wt % 5 g/L | 10 g/L | 0.1 g/L | Rh(0.1)/CZLN1(25), Al2O3(75) | 20 wt % 5 g/L | 5 g/L | 0.1 g/L | 50:50 | 0.018 | 0.020 | — |

TABLE 3-continued

| | First catalyst layer | | | | | Second catalyst layer | | | | Emission values | | PdRh Alloying rate (%) |
|---|---|---|---|---|---|---|---|---|---|---|---|---|
| | | Ceria concentration, Amount of ceria | | | Amount of Rh (A) | | Ceria concentration, Amount of ceria | | Amount of Rh (B) | | | |
| Ex | Layer configuration | 1st CZ carrier | 2nd CZ carrier | Total ceria | | Layer configuration | CZ carrier | Total ceria | | A:B | NMHC (g/km) | NOx (g/km) | |
| Ex18 | Pd(1)/Al2O3(50), Rh(0.1)/ CZLN1(25) | 20 wt % 5 g/L | — | 10 g/L | 0.1 g/L | Rh(0.1)/CZLN1(25), Al2O3(75) | 20 wt % 5 g/L | 5 g/L | 0.1 g/L | 50:50 | 0.020 | 0.022 | — |

CZLN1 = CeO$_2$/ZrO$_2$/La$_2$O$_3$/Nd$_2$O$_3$ = 20/70/5/5 (wt %)
CZL1 = CeO$_2$/ZrO$_2$/La$_2$O$_3$ = 40/55/5 (wt %)
CZL2 = CeO$_2$/ZrO$_2$/La$_2$O$_3$ = 20/75/5 (wt %)
CZL3 = CeO$_2$/ZrO$_2$/La$_2$O$_3$ = 60/35/5 (wt %)
CZL4 = CeO$_2$/ZrO$_2$/La$_2$O$_3$ = 80/15/5 (wt %)

TABLE 4

| | First catalyst layer | | | | | Second catalyst layer | | | | |
|---|---|---|---|---|---|---|---|---|---|---|
| | | Ceria concentration, Amount of ceria | | | Amount of Rh (A) | | Ceria concentration, Amount of ceria | | | Amount of Rh (B) |
| Ex | Layer configuration | 1st CZ carrier | 2nd CZ carrier | Total ceria | | Layer configuration | Pt carrier | CZ carrier | Total ceria | |
| Ex5 | Pd(1)/Al2O3(50), Rh(0.1)/CZLN1(25), CZL1(25) | 20 wt % 5 g/L | 40 wt % 10 g/L | 15 g/L | 0.1 g/L | Rh(0.1)/CZLN1(25), Al2O3(75) | — | 20 wt % 5 g/L | 5 g/L | 0.1 g/L |
| Ex19 | Pd(1)/Al2O3(50), Rh(0.1)/CZLN1(25), CZL1(25), BaSO4(10) | 20 wt % 5 g/L | 40 wt % 10 g/L | 15 g/L | 0.1 g/L | Rh(0.1)/CZLN1(25), Al2O3(75), BaSO4(3) | — | 20 wt % 5 g/L | 5 g/L | 0.1 g/L |
| Ex20 | Pd(1)/Al2O3(50), Rh(0.1)/CZLN1(25), CZL1(25) | 20 wt % 5 g/L | 40 wt % 10 g/L | 15 g/L | 0.1 g/L | Rh(0.1)/CZLN1(25), Al2O3(75) | — | 20 wt % 5 g/L | 5 g/L | 0.1 g/L |
| Ex21 | Pd(1)/Al2O3(50), Rh(0.1)/CZLN1(25), CZL1(25) | 20 wt % 5 g/L | 40 wt % 10 g/L | 15 g/L | 0.1 g/L | Pd(0.05)/Al2O3(25), Pt(0.05)/CZLY(25) | 15 wt % 3.75 g/L | — | 3.75 g/L | — |
| Ex22 | Pd(1)/Al2O3(50), Rh(0.1)/CZLN1(25), CZL1(25) | 20 wt % 5 g/L | 40 wt % 10 g/L | 15 g/L | 0.1 g/L | Rh(0.1)/CZL(25), Al2O3(75) | — | 90 wt % 22.5 g/L | 22.5 g/L | 0.1 g/L |
| Ex23 | Pd(1)/Al2O3(50), Rh(0.1)/CZLN1(25), CZL1(25) | 20 wt % 5 g/L | 40 wt % 10 g/L | 15 g/L | 0.1 g/L | Rh(0.1)/Al2O3(25), Al2O3(75) | (Al2O3) | — | — | 0.1 g/L |

| | 3rd catalyst layer | | | Emission values | | |
|---|---|---|---|---|---|---|
| Ex | Layer configuration | Amount of Rh (g/L) | A:B | NMHC (g/km) | NOx (g/km) | PdRh Alloying rate (%) |
| Ex5 | — | — | 50:50 | 0.010 | 0.010 | 8 |
| Ex19 | — | — | 50:50 | 0.008 | 0.007 | — |
| Ex20 | Pd(0.05)/Al2O3(25), Pt(0.05)/CZLY(25) | — | 50:50 | 0.007 | 0.007 | — |
| Ex21 | Rh(0.1)/CZLN1(25), Al2O3(75) | 0.1 g/L | 100:0 | 0.014 | 0.016 | — |
| Ex22 | — | — | 50:50 | 0.014 | 0.019 | — |
| Ex23 | — | — | 50:50 | 0.014 | 0.018 | — |

CZLN1 = CeO$_2$/ZrO$_2$/La$_2$O$_3$/Nd$_2$O$_3$ = 20/70/5/5 (wt %)
CZL1 = CeO$_2$/ZrO$_2$/La$_2$O$_3$ = 40/55/5 (wt %)
CZLY = CeO$_2$/ZrO$_2$/La$_2$O$_3$/Y$_2$O$_3$ = 15/75/5/5 (wt %)
CLN = CeO$_2$/La$_2$O$_3$/Nd$_2$O$_3$ = 90/5/5 (wt %)

REFERENCE SIGNS LIST

100 Exhaust gas purification device
1 Substrate
2 First catalyst layer
21 Pd
22 Alumina
23 First ceria-zirconia carrier particle
24 Rh
25 Second ceria-zirconia carrier particle
26 Ceria-zirconia carrier particle of prior art
3 Second catalyst layer
4 Third catalyst layer

The invention claimed is:
1. An exhaust gas purification device, comprising:
a first catalyst layer comprising:
a Pd-supporting catalyst supporting Pd on an alumina carrier particle, a first Rh-supporting catalyst supporting Rh on a first ceria-zirconia carrier particle, and a second ceria-zirconia carrier particle; and a second catalyst layer located under the first catalyst layer comprising:

a second Rh-supporting catalyst supporting Rh on the first ceria-zirconia carrier particle, wherein the ceria concentration in the first ceria-zirconia carrier particle is 30% by weight or less and the amount of ceria in the second ceria-zirconia carrier particle is larger than the amount of ceria in the first ceria-zirconia carrier particle, wherein the ratio between the amount of Rh of the first Rh-supporting catalyst and the amount of Rh of the second Rh-supporting catalyst is within the range of 10:90 to 90:10.

2. The exhaust gas purification device according to claim 1, wherein the ceria concentration in the second ceria-zirconia carrier particle is greater than 30% by weight.

3. The exhaust gas purification device according to claim 1, wherein the first catalyst layer further comprises barium sulfate.

4. The exhaust gas purification device according to claim 1, wherein the second catalyst layer comprises barium sulfate.

5. The exhaust gas purification device according to claim 1, further comprising one or more layers located under the second catalyst layer.

6. The exhaust gas purification device according to claim 1, wherein the first catalyst layer is present on a substrate.

7. The exhaust gas purification device according to claim 1, having the second catalyst layer between the first catalyst layer and a substrate.

8. The exhaust gas purification device according to claim 5, having the one or more layers between the second catalyst layer and a substrate.

* * * * *